D. B. GARNER.
WAGON BRAKE.
APPLICATION FILED NOV. 20, 1911.
1,050,014.
Patented Jan. 7, 1913.
2 SHEETS—SHEET 2.
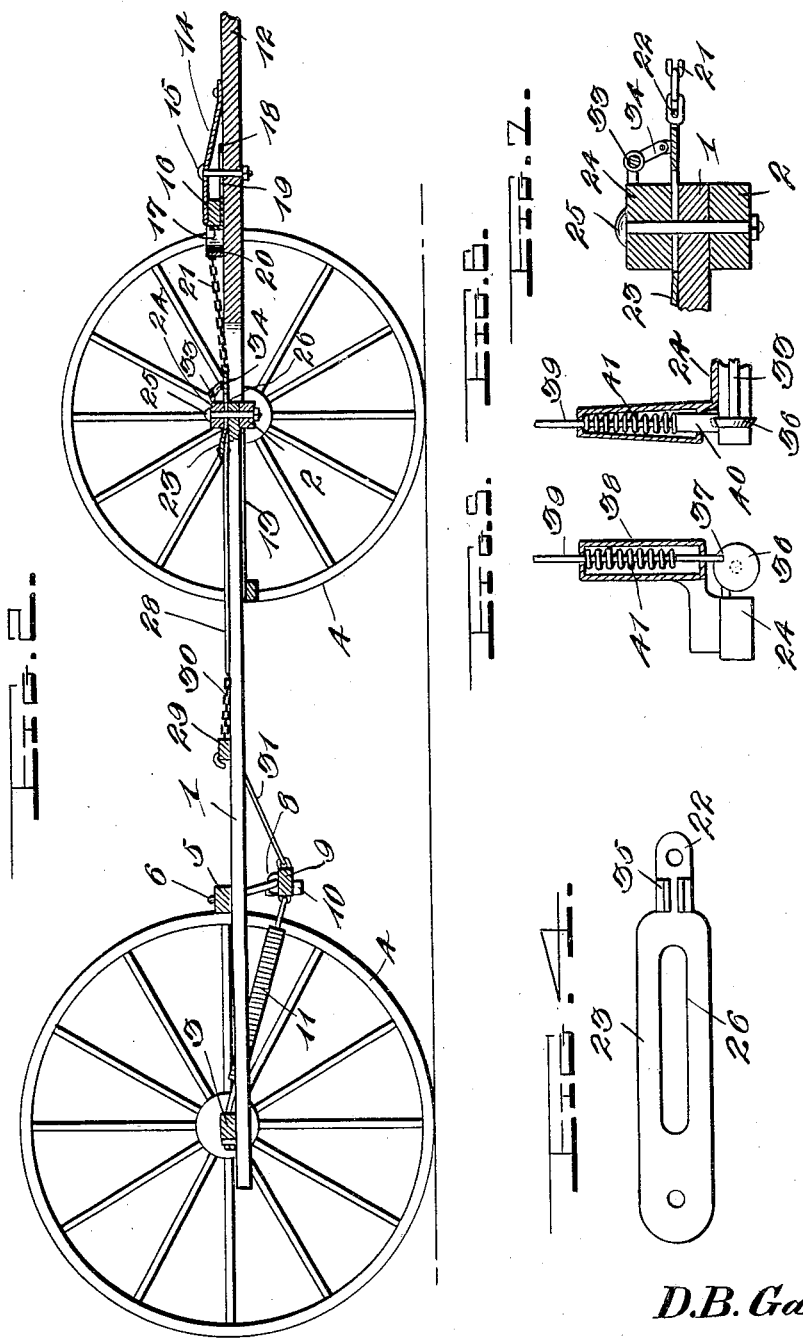
Inventor
D. B. Garner,
Witnesses
Chas. L. Grieshaber.
L. H. Ellis.
By Watson E. Coleman.
Attorney

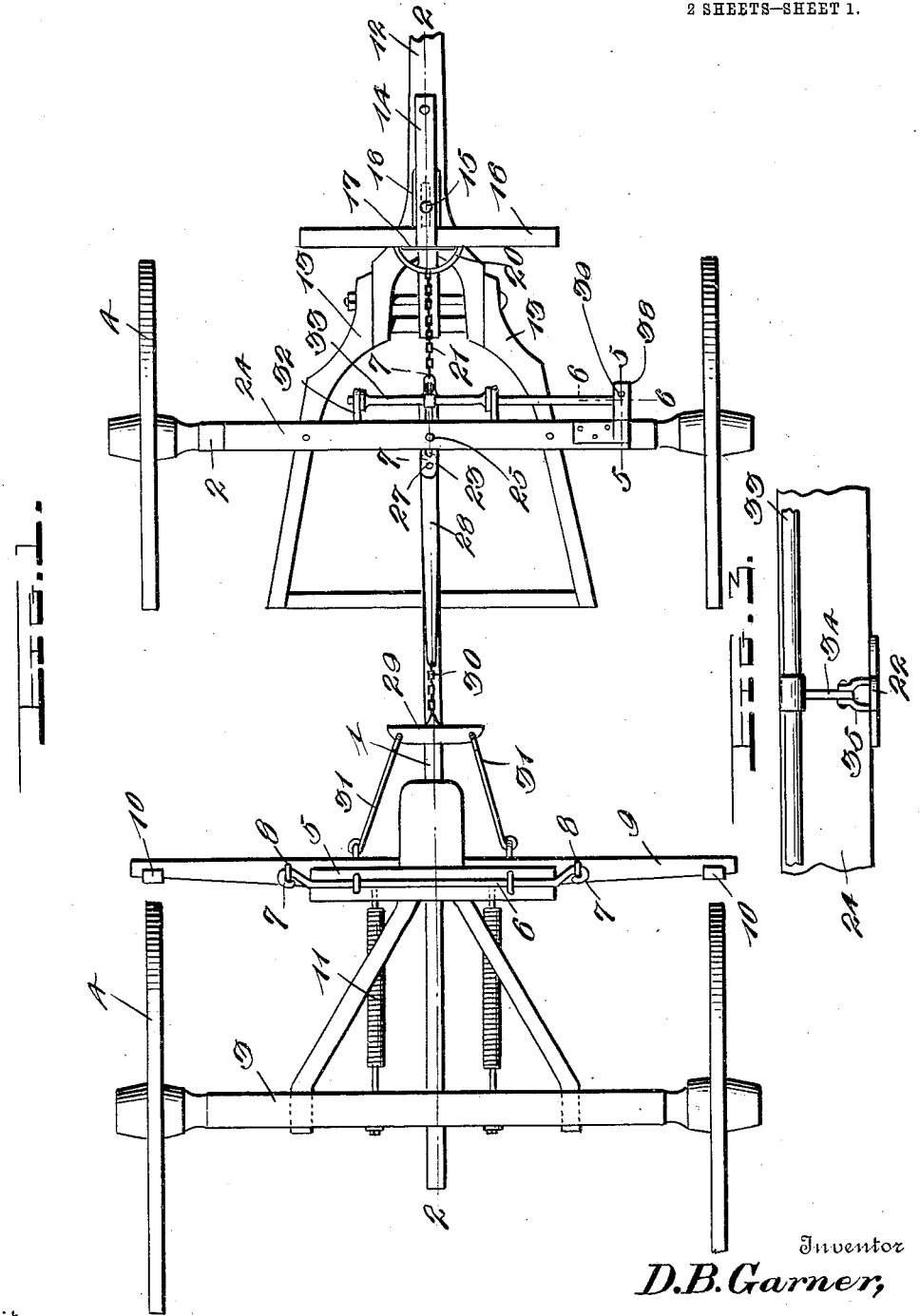

UNITED STATES PATENT OFFICE.

DANIEL B. GARNER, OF VINCENNES, INDIANA, ASSIGNOR OF ONE-HALF TO ALFRED WELTON, SR., OF VINCENNES, INDIANA.

WAGON-BRAKE.

1,050,014.  Specification of Letters Patent.  Patented Jan. 7, 1913.

Application filed November 20, 1911. Serial No. 661,215.

*To all whom it may concern:*

Be it known that I, DANIEL B. GARNER, a citizen of the United States, residing at Vincennes, in the county of Knox and State of Indiana, have invented certain new and useful Improvements in Wagon-Brakes, of which the following is a specification, reference being had to the accompanying drawings.

My invention relates to new and useful improvements in vehicle brakes and more particularly to brakes for vehicles such as hay wagons and the like and my object is to provide a device of this character which may be automatically operated by the draft devices.

A further object of the invention resides in providing a brake which is adapted to be normally disposed in its effective position and which is adapted to be moved to its ineffective position by the pulling of the draft device.

Still another object of this invention resides in providing improved means for the retention of the brake in its ineffective position, and a still further object resides in providing a device of this character which is simple and durable in construction, inexpensive to manufacture and one which is very effective and useful in operation.

With these and other objects in view, my invention consists in the novel features of construction, combination and arrangement of parts as will be hereinafter referred to and more particularly pointed out in the specification and claims.

In the drawings forming part of this application, Figure 1 is a top plan view of the frame of a hay wagon or the like showing my improved brake applied to use thereon. Fig. 2 is a longitudinal section therethrough as seen on line 2—2 of Fig. 1. Fig. 3 is a fragmentary front elevation of the trip rod, showing its connection with the sliding plate. Fig. 4 is a top plan view of the sliding plate. Fig. 5 is a section as seen on line 5—5 of Fig. 1 showing the means for retaining the trip rod and correspondingly the brake in its ineffective position. Fig. 6 is a similar view as seen on line 6—6 of Fig. 1. Fig. 7 is a lower longitudinal section seen on line 7—7 of Fig. 1.

In carrying out my invention, I shall refer to the drawings in which similar reference characters designate corresponding parts throughout the several views and in which—

1 indicates the longitudinal beam or standard mounted on the front and rear axles 2 and 3 respectively which have mounted thereon the supporting wheels 4 and this structure with its adjunctive parts forms the truck for any desired vehicle, such as hay wagons or the like. Rigidly mounted on the beam 1 adjacent the rear axle 3 is a transverse bar 5 which has rotatably mounted thereon a rod or the like 6, the ends of which project beyond the ends of the bar 5 and are formed into hooks or the like 7 which hooks receive in engagement therewith the upper ends of a pair of depending stems or arms 8. These arms 8 have pivotally connected to the lower ends thereof the brake beam 9 carrying immediately adjacent its ends the brake shoes 10 and in order to provide means whereby the brake beam will be drawn rearwardly to correspondingly engage the shoes with the rear wheels of the truck, a pair of coil springs 11 are provided which have one of their ends engaged with said brake beam and the opposite ends thereof secured to the rear axle 3. The tendency of these springs, it will be seen, will be to draw the brake beam rearwardly to prevent the rotation of the rear wheels of the device and I have provided means for the automatic withdrawal of said brake from its effective position with the drawing of the vehicle forwardly, which means will be hereinafter more particularly described.

The draft tongue 12 which is secured to the members 13 in the usual or any preferred manner has secured thereto one end of the plate or the like 14, which plate is bent upwardly for a portion of its length to space the same in the upper face of said tongue so that a bolt 15 which extends through said plate and the tongue 12 may be effective in the space between these two members and disposed in this space between the tongue 12 and the plate 14 is a doubletree 16. This double-tree has secured on the rear and under faces thereof the angular sides of a substantially L-shaped plate 17, said plate having an extension or tongue 18 thereon which is slotted as shown at 19 to receive the bolt 15 therethrough and it will be seen that in view of this construction, said double-tree is capable of a sliding movement on the tongue 12, said bolt and slot being the means for limiting the movement thereof. Also secured on the rear face of the double-tree 16 is an arcuate band or rim 20 which has secured thereto one end of a link chain 21, the opposite end of said chain being engaged with a tongue or shank 22 formed on the one end of a plate 23, said plate being disposed on the upper face of the forward end of said beam or standard 1 and a transverse bar 24 which is secured to the members 13 immediately above and in alinement with the axle 2 has extending therethrough and through the axle, the king bolt 25, which bolt extends through a longitudinal slot 26 formed in the plate 23. Thus it will be seen that the plate 23 is capable of a sliding movement on the beam 1 to correspond with the sliding movement of the double-tree 16, it being understood that the bolt 25 limits the movement of said plate; and secured to the rear end of the plate 23 by means of a rivet or similar connection 27 is a strip 28 which rests on the beam 1. A transverse bar or arm 29 is connected to the rear end of the plate 28 by means of a link chain 30 and is also connected to the brake beam 9 by means of a pair of rods or arms 31 and from this construction it will be seen that while the springs 11 will normally dispose the brake shoes 10 in their effective positions in contact with the rear wheels of the device, any pull upon the double-tree 16, sufficient to overcome the tension of the springs 11, will withdraw said brake shoes from their effective positions, whereby it will be appreciated that when draft devices are attached to said double-tree and driven forwardly to propel the vehicle, the brake will be disposed ineffectively. I have provided means, however, for the retention of the brake in its ineffective position so that any slight slack in the pull upon the swingle-tree will not permit of the brake being disposed effectively and to this extent, I provide the front face of the bar 24 with the bearings which have rotatably mounted therein a rod 33. This rod has mounted thereon an arcuately depending arm 34 which has its outer end pivotally disposed between a pair of ears or the like 35 formed on the tongue 22 of the plate 23 whereby it will be seen that as the plate 23 is drawn forwardly and rearwardly by the action, respectively, of the draft device and the springs 11, said rod 33 will be partially rotated and the one end of said rod 33 has formed thereon a head member or the like 36 which is circular and provided with a notch 37. Carried on the bar 24 immediately over the head member 36 is a casing 38, through which extends an arm or rod 39, the lower end of said arm being formed into a detent or the like 40 to extend below said casing and encircling said arm within the casing is a coil spring 41 which is so arranged in connection therewith as to normally force said detent 40 downwardly into engagement with the head 36. Thus it will be seen that where said head is rotated with the rotation of the rod 33, the notch 37 will be disposed in the position to receive therein the detent 40 and as said notch is so arranged to receive the detent at the time the double-tree is moved to the extremity of its forward movement, the brake will be retained in its ineffective position. To release the detent 40 from its engagement with the head member 36, it is only necessary to raise the arm 39, which may be done manually in any desired manner whatsoever, whereupon the rod 33 may be permitted to rotate, if no pull be exerted on the double-tree and the brake will return to its effective position.

In operation it will be seen that the detent 40 may be released from its engagement with the notch 37 to permit the brake to be effectively disposed from its engagement with the rear wheels of the device and the draft devices applied in the usual manner to the double-tree 16. As the device is propelled forwardly, the pull exerted upon the double-tree 16 will be sufficient to draw the brake beam 9 forwardly and simultaneous with the drawing of the double-tree forwardly, will be the rotation of the rod 33 and as the pull becomes sufficiently great, the notch 37 in the head 36 on said rod will be disposed in position to be engaged by the detent 40. This engagement of the detent with the notch in said head will retain the brake in its ineffective position until such time as the rod 39 is drawn upwardly and should at any time the driver find it necessary to apply the brake, he may withdraw this rod or arm 39 and the release of the pull exerted on the double-tree 16 will permit the springs 11 to draw the brake beam rearwardly to effect the brake to the rear wheel.

From the foregoing it will be seen that I have provided an improved brake attachment for vehicles which is disposed to operate from the whiffle-tree on the vehicle. It will further be seen that the same is designed to be normally disposed in its effective position so that the pull exerted upon the whiffle-tree must be sufficient to overcome the tension of the springs in order to dispose said brakes ineffectively. It will still further be seen that I have provided means for the retention of said brake mechanism in its ineffective position, which device is automatically operated from the pull exerted upon the whiffle-tree. Furthermore, it will be seen that the device is simple and durable in construction, inexpensive to manufacture, is one which may be applied to any wagon now in use and is efficient and useful in operation.

What I claim is:—

1. In a device of the class described, the combination with a vehicle truck having a brake beam thereon, and a whiffletree slidably arranged on said truck; of spring means adapted to normally retain said brake beam in its effective position, connecting means between said brake beam and whiffletree to withdraw the former to its ineffective position upon the exertion of a pull upon the latter, a rod rotatably mounted on the truck and having connections with the aforesaid connecting means to be partially rotated with the movement of said whiffletree, a head formed on said rod having a notch therein, and a spring detent carried on the truck adapted for automatic engagement with said notch to prevent the rotation of said rod and correspondingly retain said brake beam in its ineffective position.

2. The combination with a vehicle truck having a brake beam thereon, and whiffletree slidably arranged on said truck; of spring means to normally retain said brake beam in its effective position, a plate slidably arranged on said truck, connecting means between said plate and whiffletree, additional connecting means between said plate and brake beam, a rod rotatably carried on said truck and having a lateral arm thereon in pivotal connection with said plate, a head formed on said rod having a notch therein, and a spring detent also carried on the truck adapted for automatic engagement with the notch in said head as said rod is rotated, whereby the further rotation of said rod will be temporarily prevented to correspondingly retain said brake beam in its ineffective position.

3. In a device of the class described, the combination with a vehicle truck having a brake beam thereon, and a whiffletree slidably arranged on said truck; of means to normally retain said brake beam in its effective position, connecting means between said brake beam and whiffletree to withdraw the former from its ineffective position upon the exertion of a pull upon the latter, a bar extending transversely of the truck, a rod rotatably supported on said bar and having connection with the aforesaid connecting means to be partially rotated with the movement of said whiffletree, a head formed on said rod having a notch therein, a casing mounted on the bar and extending immediately over said head, and a spring detent carried in said casing and extending therebelow, said detent being adapted for engagement with the notch in said head to prevent the rotation of said rod and correspondingly retain said brake beam in its ineffective position.

In testimony whereof I hereunto affix my signature in the presence of two witnesses.

DANIEL B. X GARNER.
his mark

Witnesses:
OTTO C. BUSSE,
CHARLES A. RICHARDSON.

---

Copies of this patent may be obtained for five cents each, by addressing the "Commissioner of Patents, Washington, D. C."